(12) United States Patent
Nakamura et al.

(10) Patent No.: US 11,392,093 B2
(45) Date of Patent: Jul. 19, 2022

(54) PREDICTION CONTROL DEVICE AND METHOD

(71) Applicant: HITACHI AUTOMOTIVE SYSTEMS, LTD., Hitachinaka (JP)

(72) Inventors: Toshiaki Nakamura, Tokyo (JP); Teppei Hirotsu, Tokyo (JP); Tatsuya Horiguchi, Tokyo (JP); Tadanobu Toba, Tokyo (JP); Hideyuki Sakamoto, Ibaraki (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 176 days.

(21) Appl. No.: 16/755,907

(22) PCT Filed: Sep. 28, 2018

(86) PCT No.: PCT/JP2018/036214
§ 371 (c)(1),
(2) Date: Apr. 14, 2020

(87) PCT Pub. No.: WO2019/077971
PCT Pub. Date: Apr. 25, 2019

(65) Prior Publication Data
US 2020/0301374 A1 Sep. 24, 2020

(30) Foreign Application Priority Data

Oct. 17, 2017 (JP) .............................. JP2017-200888

(51) Int. Cl.
*G05B 13/00* (2006.01)
*G05B 13/02* (2006.01)
*B60W 50/06* (2006.01)

(52) U.S. Cl.
CPC ........... *G05B 13/026* (2013.01); *B60W 50/06* (2013.01)

(58) Field of Classification Search
CPC ...................................................... B60W 50/06
See application file for complete search history.

(56) References Cited

U.S. PATENT DOCUMENTS 10,875,575 B2 * 12/2020 Kunihiro .............. B62D 15/025
2003/0187578 A1 10/2003 Nishira et al.
(Continued)

FOREIGN PATENT DOCUMENTS

| JP | 2004-086289 A | 3/2004 |
| JP | 2004-118723 A | 4/2004 |

(Continued)

OTHER PUBLICATIONS

International Search Report with English Translation, PCT/JP2018/036214, dated Jan. 15, 2019, 4pgs.

*Primary Examiner* — Russell Frejd
*Assistant Examiner* — Brittany Renee Peko
(74) *Attorney, Agent, or Firm* — Volpe Koenig (57) ABSTRACT

A prediction control device controls an actuator for automatic driving of a vehicle including: a command value generation unit generating an operation amount for the actuator and an operation amount candidate as a predicted value; an output prediction unit outputting a control amount candidate as a predicted value corresponding to the actuator output by using an operation model; an evaluation function calculation unit expressing constraint conditions for the automatic driving; a situation degree detection obtaining a measure of giving priority to ride comfort or giving priority to danger avoidance of an own vehicle while traveling; and a responsiveness adjusting unit obtaining a next operation amount candidate from the situation degree from the situation degree detection unit. The operation command value generation unit generates an operation amount for the actua- (Continued)

tor, and the responsiveness adjusting unit adjusts the output of the evaluation function according to the situation degree.

17 Claims, 9 Drawing Sheets

(56) References Cited

U.S. PATENT DOCUMENTS

| | | | |
|---|---|---|---|
| 2005/0236211 A1* | 10/2005 | Hirota | B60R 21/00 180/274 |
| 2009/0287376 A1 | 11/2009 | Aso | |
| 2015/0360688 A1 | 12/2015 | Tanaka et al. | |
| 2018/0050695 A1* | 2/2018 | Sundaram | B60W 30/10 |
| 2019/0114345 A1* | 4/2019 | Misawa | G06F 17/30522 |
| 2019/0263368 A1* | 8/2019 | Takahashi | B60T 8/17554 |

FOREIGN PATENT DOCUMENTS

| | | |
|---|---|---|
| JP | 2008-143269 A | 6/2008 |
| JP | 2010-202139 A | 9/2010 |
| JP | 2017-084110 A | 5/2017 |
| WO | 2014-118962 A1 | 8/2014 |

\* cited by examiner

SELECT VALUE CLOSE TO PREVIOUS TIME

FIG. 9B

■$W_p$: SMALL (DANGER AVOIDANCE PRIORITY)

SELECT VALUE NOT DEPENDING ON PREVIOUS TIME

PREDICTION CONTROL DEVICE AND METHOD

TECHNICAL FIELD

The present invention relates to a prediction control device and method applied to automatic driving of a vehicle.

BACKGROUND ART

In recent years, the automatic driving of vehicles is in the direction of practical use, and in this case, the application of model prediction control is expanding by the trajectory generation of automatic driving and the like.

As a prediction control technique in automatic driving of a vehicle, a device as described in PTLs 1 and 2 is disclosed.

In PTL 1, as a prediction control device and a recommended operation presentation device that can prevent the occurrence of chattering and improve responsiveness, an example is described which includes means for correcting, when an input operation amount to a system changes abruptly, the operation amount such that the change in the operation amount does not exceed a threshold value in order to ensure ride comfort.

In PTL 2, in consideration of the relationship with the future position of the surrounding vehicles, as a vehicle control device capable of appropriately controlling a behavior of an own vehicle including a lateral direction, an example is described in which an amount of change in previous and current traveling directions and an amount of change in previous and current acceleration/deceleration are included in an evaluation function of the model prediction control in order to ensure ride comfort.

CITATION LIST

Patent Literature

PTL 1: JP 2004-118723 A
PTL 2: JP 2017-084110 A

SUMMARY OF INVENTION

Technical Problem

In PTLs 1 and 2, prediction control is mainly performed with emphasis on ride comfort, but on the other hand, there are cases where quick operation in an emergency is required.

When model prediction control is applied for trajectory generation of automatic driving or the like, the state quantity of steering operation, accelerator operation, brake operation, or the like is obtained by calculation, but discontinuous operations may occur on a time axis.

Therefore, in accordance with the driving of a person, a model prediction control is desirably performed in which ride comfort during normal driving is compatible with a rapid operation in an emergency.

In view of the above, an object of the present invention is to provide a prediction control device and a method in which both ride comfort during normal driving and a rapid operation in an emergency can be achieved as if a person drives.

Solution to Problem

From the above, the present invention is "a prediction control device that determines an operation amount given to an actuator for automatic driving of a vehicle, the device including: an operation command value generation unit that generates an operation amount for the actuator and an operation amount candidate as a predicted value; an output prediction unit that outputs a control amount candidate as a predicted value corresponding to the actuator output by using a state equation expressing an operation model of the vehicle in a formula; an evaluation function calculation unit that expresses constraint conditions necessary for the automatic driving of the vehicle by a plurality of functions, and obtains a sum of outputs of the respective functions with respect to the constraint conditions; a situation degree detection unit that obtains a situation degree that is a measure of giving priority to ride comfort or giving priority to danger avoidance from a surrounding situation of an own vehicle while traveling; and a responsiveness adjusting unit that obtains a next operation amount candidate from the situation degree from the situation degree detection unit, wherein the operation command value generation unit generates an operation amount for the actuator according to an output of an evaluation function output from the evaluation function calculation unit, and the responsiveness adjusting unit adjusts the output from the evaluation function calculation unit according to the situation degree".

Further, the present invention is "a prediction control method that determines an operation amount given to an actuator for automatic driving of a vehicle, the method including: generating an operation amount for the actuator and an operation amount candidate as a predicted value; obtaining a control amount candidate as a predicted value corresponding to the actuator output by using a state equation expressing an operation model of the vehicle in a formula; expressing constraint conditions necessary for the automatic driving of the vehicle by a plurality of functions, and obtaining a sum of outputs of the respective functions with respect to the constraint conditions; obtaining a situation degree that is a measure of giving priority to ride comfort or giving priority to danger avoidance from a surrounding situation of an own vehicle while traveling; and obtaining a next operation amount candidate from the situation degree from the situation degree detection unit, wherein an operation amount for the actuator is generated according to outputs from evaluation functions, and the outputs from the evaluation functions are adjusted according to the situation degree".

Further, the present invention is "a prediction control device that determines an operation amount given to an actuator for automatic driving of a vehicle, the device including: a unit that detects a situation degree from surrounding information and vehicle information; a unit that generates an operation amount per unit time from the surrounding information and the vehicle information and outputs the operation amount to the actuator; and a unit that adjusts a difference between a current operation amount and a next operation amount according to a value of the situation degree".

Further, the present invention is "a prediction control method that determines an operation amount given to an actuator for automatic driving of a vehicle, the method including: detecting a situation degree from surrounding information and vehicle information; generating an operation amount per unit time from the surrounding information and the vehicle information and outputting the operation amount to the actuator; and adjusting a difference between a current operation amount and a next operation amount according to a value of the situation degree".

Advantageous Effects of Invention

According to the present invention, it is possible to provide a prediction control device in which both ride comfort during normal driving and a rapid operation in an emergency are achieved as if a person drives.

DESCRIPTION OF EMBODIMENTS

Hereinafter, embodiments of the invention will be described using the drawings.

Embodiments

Figure 1:
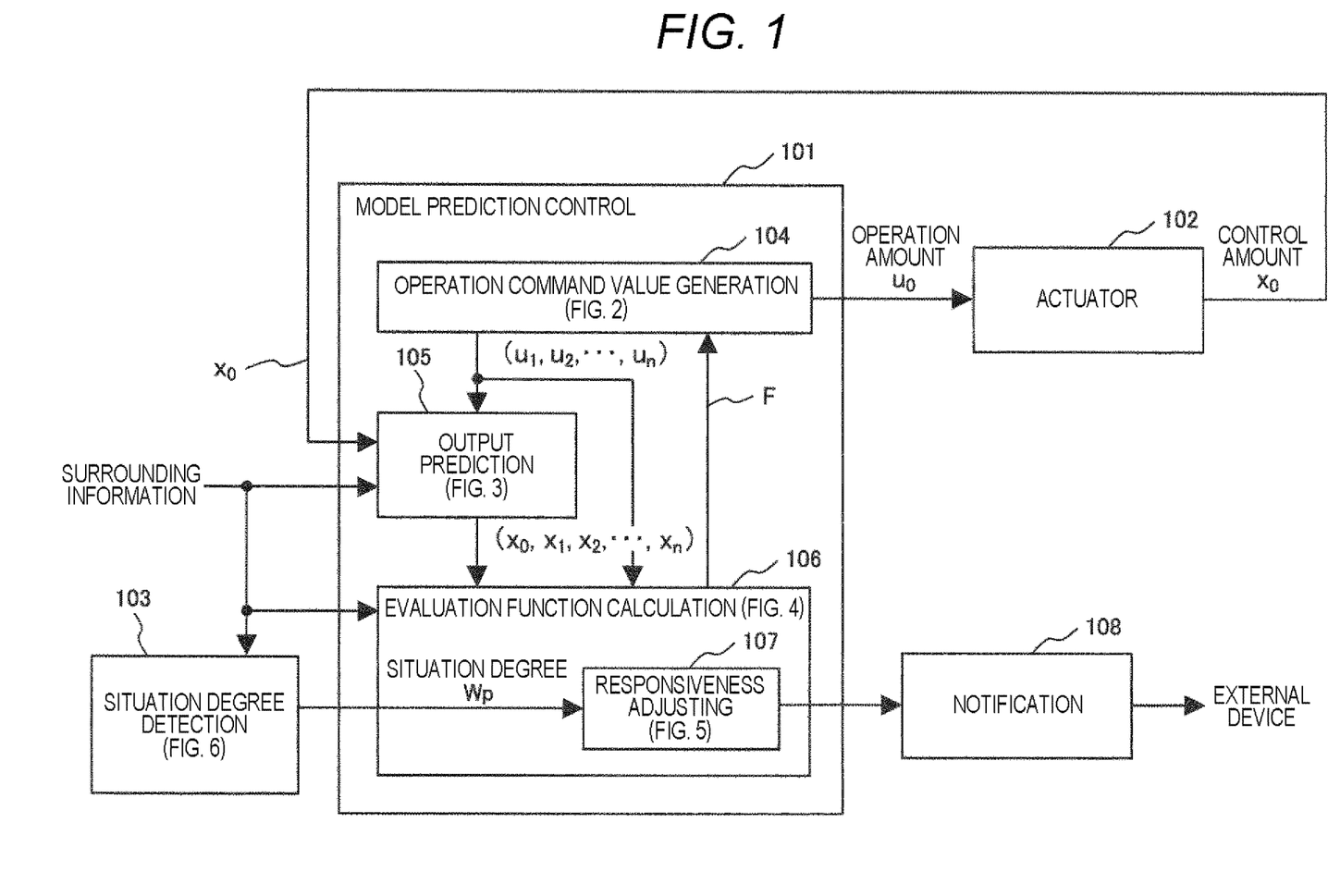
FIG. 1 is a diagram illustrating an example of a block configuration of an automatic driving control system for a vehicle according to an embodiment of the present invention.

FIG. 1 is a diagram illustrating an example of a block configuration of an automatic driving control system for a vehicle according to an embodiment of the present invention.

In FIG. 1, a model prediction control unit 101 predicts the speed and traveling direction of an own vehicle in future several seconds, for example, every several milliseconds based on information about the surroundings of the own vehicle, and performs a process of obtaining the operation amount after next several milliseconds. Part of this input is surrounding information, and part of the output is an operation amount $u_0$ of steering operation, accelerator operation, brake operation, or the like for an actuator 102. Further, the model prediction control unit 101 inputs a control amount $x_0$ output from the actuator 102 and information Wp of a situation degree from a situation degree detection unit 103, and provides responsiveness adjustment information to a notification unit 108.

The model prediction control unit 101 includes an operation command value generation unit 104, an output prediction unit 105, an evaluation function calculation unit 106, and a responsiveness adjusting unit 107.

The operation command value generation unit 104 is a unit that generates operation amount candidates ($u_1$ to $u_n$) as predicted values for the future n seconds every several milliseconds, for example, from a current operation amount $u_0$ and a next operation amount $u_1$. The operation command value generation unit 104 will be described later with reference to FIG. 2.

For example, the output prediction unit 105 is a unit that inputs the operation amount candidates ($u_1$ to $u_n$), the surrounding information, and the current control amount $x_0$ of the own vehicle to a state equation expressing the operation model of the vehicle in a formula and outputs the corresponding control amount (such as a speed, a position, and a direction) as control amount candidates ($x_1$ to $x_n$) as predicted values. The output prediction unit 105 will be described later with reference to FIG. 3.

The evaluation function calculation unit 106 is a unit that expresses the constraints necessary for the automatic driving by a plurality of functions, inputs the operation amount candidates ($u_1$ to $u_n$) and the control amount candidates ($x_1$ to $x_n$), and outputs a sum F of the respective function outputs for the constraint conditions. The evaluation function calculation unit 106 will be described later with reference to FIG. 4.

The situation degree detection unit 103 is a unit that outputs a situation degree Wp, which is a measure of giving priority to ride comfort or danger avoidance, based on the surrounding situation of the traveling own vehicle. The situation degree detection unit 103 will be described later with reference to FIG. 6.

The responsiveness adjusting unit 107 is a unit that obtains the next operation amount candidate $u_1$ from the current operation amount $u_0$ and the situation degree Wp input from the situation degree detection unit 103. The responsiveness adjusting unit 107 will be described later with reference to FIGS. 5A, 5B, and 5C.

The notification unit 108 is a unit that notifies the output (the situation degree Wp and the next operation amount candidate) from the responsiveness adjusting unit 107 to the outside. For example, a display or a speaker notifies an occupant of emergency operation, and a radio network notifies surrounding vehicles of attention calling or the like.

In the model prediction control unit 101 having the above configuration, a loop process of the operation command value generation unit 104 to the evaluation function calculation unit 106 is repeated a plurality of times, for example, for several milliseconds, the operation amount candidate ($u_1$ to $u_n$) in which the total sum F of the evaluation functions becomes minimum is selected, and an operation amount $u_1$ at the next time point is outputted to the actuator 102. The actuator 102 converts the operation amount u into a control amount x, and executes brake operation, accelerator operation, steering operation, and the like.

FIGS. 7A-7D are diagrams illustrating an operation example of automatic driving by model prediction control. A series of overtaking operations is assumed in which a vehicle 701 by automatic driving while traveling in the traveling lane of the highway overtakes a vehicle 702 traveling in the same traveling lane and returns to the traveling lane again before catching up with a preceding vehicle 703 on the overtaking lane.

FIGS. 7A-7D are diagrams in which the own vehicle 701 is traveling behind the other vehicle 702 and the other vehicle 703 on the highway. At this time, in order to perform efficient driving, the own vehicle 701 selects a time-series control amount $x_0$ to $x_n$ indicated by a thick solid line arrow from a plurality of candidates of the control amount x (indicated by dotted lines) and determines $x_1$ as the control amount at the next time point.

Figures 7, 7A:
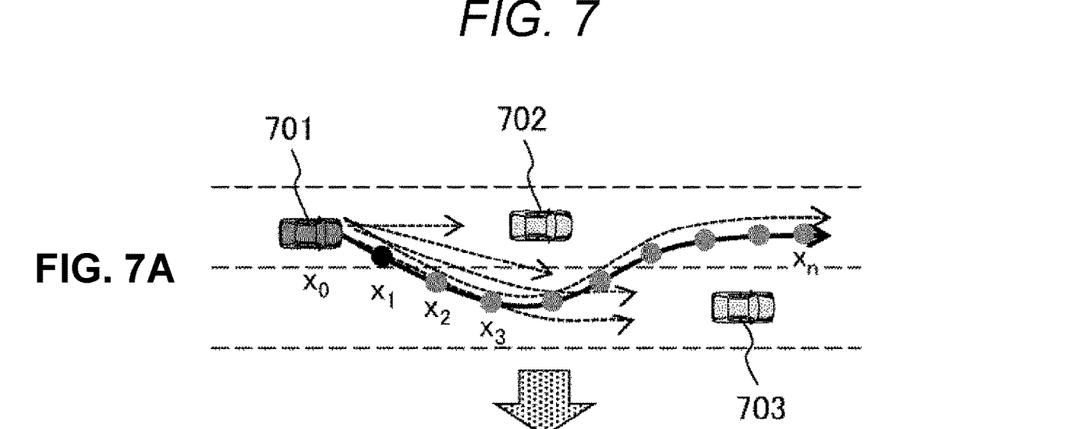
FIGS. 7A-7D are diagrams illustrating an operation example of automatic driving by model prediction control.
Figure 7B:
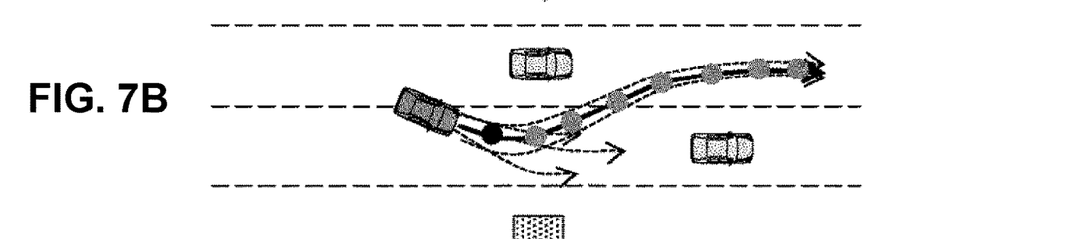
Figure 7C:
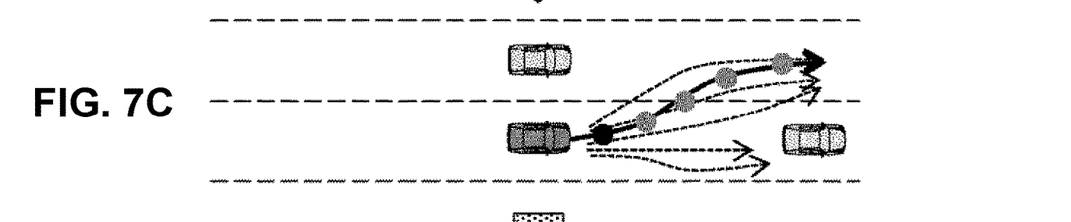
Figure 7D:
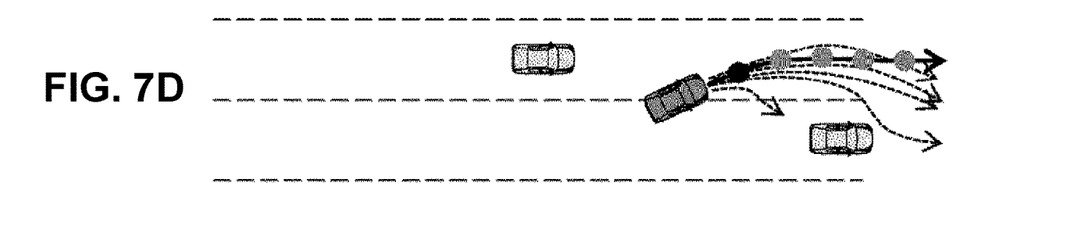

FIGS. 7B to 7D illustrate a process in which the own vehicle 701 overtakes the other vehicle 702. The time-series control amount $x_0$ to $x_n$ indicated by a bold arrow is selected from a plurality of control amount candidates at each point by the model prediction control, and $x_1$ is determined as the control amount at the next time point.

The problem of the present invention when traveling as illustrated in FIGS. 7A-7D will be specifically described with reference to FIGS. 8A-8C. The model prediction control unit 101 illustrated in FIG. 1 obtains the operation amount u at which the output of the evaluation function F is minimized in one processing time unit. FIG. 8C is a diagram illustrating the operation amount u on a horizontal axis and the evaluation function F on a vertical axis. As for the output of the evaluation function F obtained in one processing time unit of the processing cycle, when the input $u_1$ at which the output of the current evaluation function $F_1$ is minimum is significantly different from the input $u_0$ at which the output of the previous evaluation function $F_0$ is minimum, the obtained value of the operation amount u (and thus the value of the control amount x) is also significantly different.

Figure 8A:
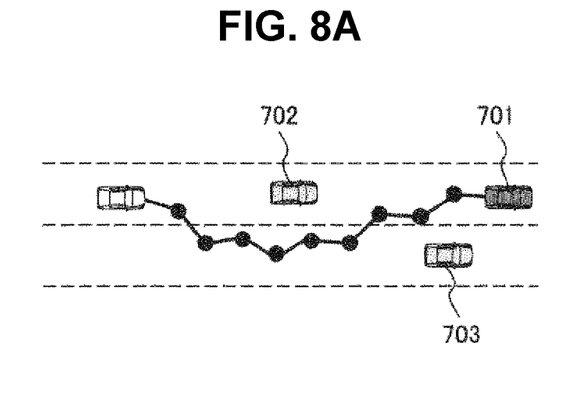
FIGS. 8A-8C are diagrams specifically illustrating a problem of the present invention when traveling as illustrated in FIGS. 7A-7D.
Figure 8B:
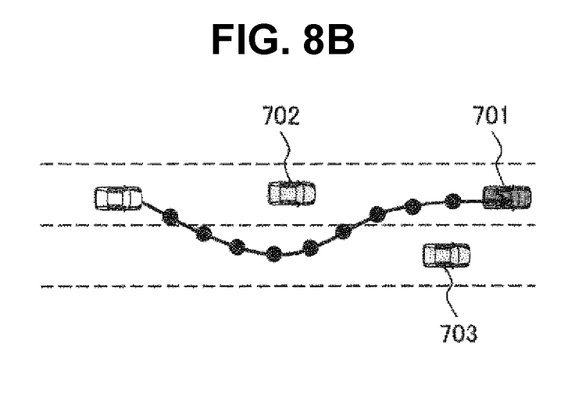
Figure 8C:
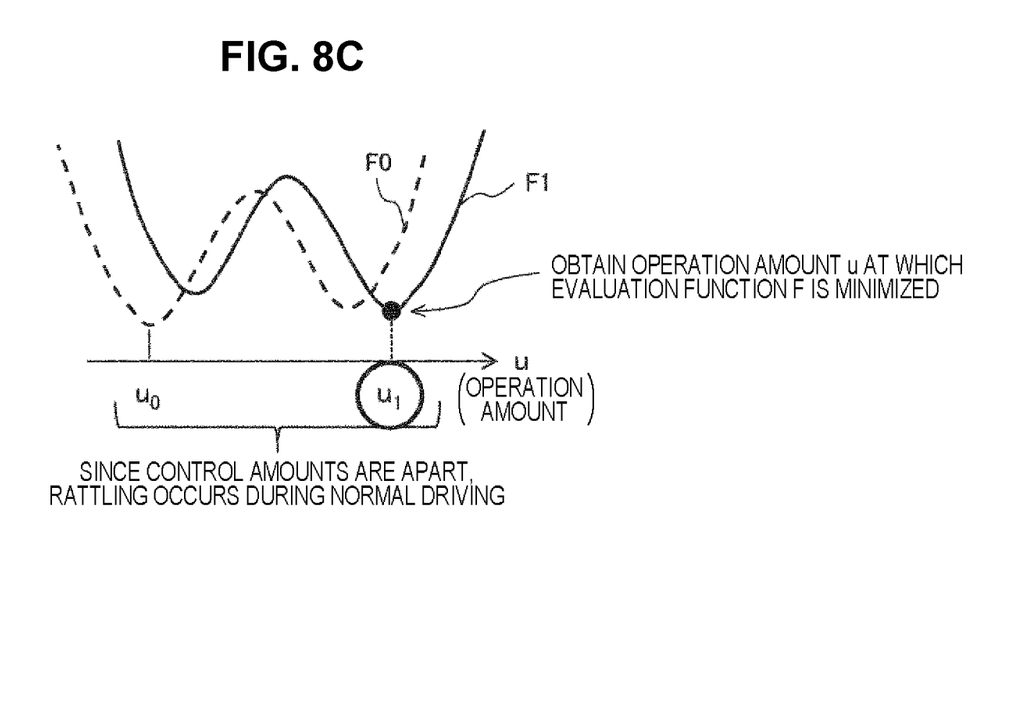

As a result, as illustrated in FIG. 8A, the steering operation, the accelerator operation, and the brake operation are rattled during the actual automatic driving, so as to deteriorate the ride comfort. Therefore, an object of the present invention is to realize smooth automatic driving and improve ride comfort as illustrated in FIG. 8B.

Hereinafter, a detailed configuration of each unit of the prediction control device illustrated in FIG. 1 for realizing smooth automatic driving and improving ride comfort will be described.

Figure 2:
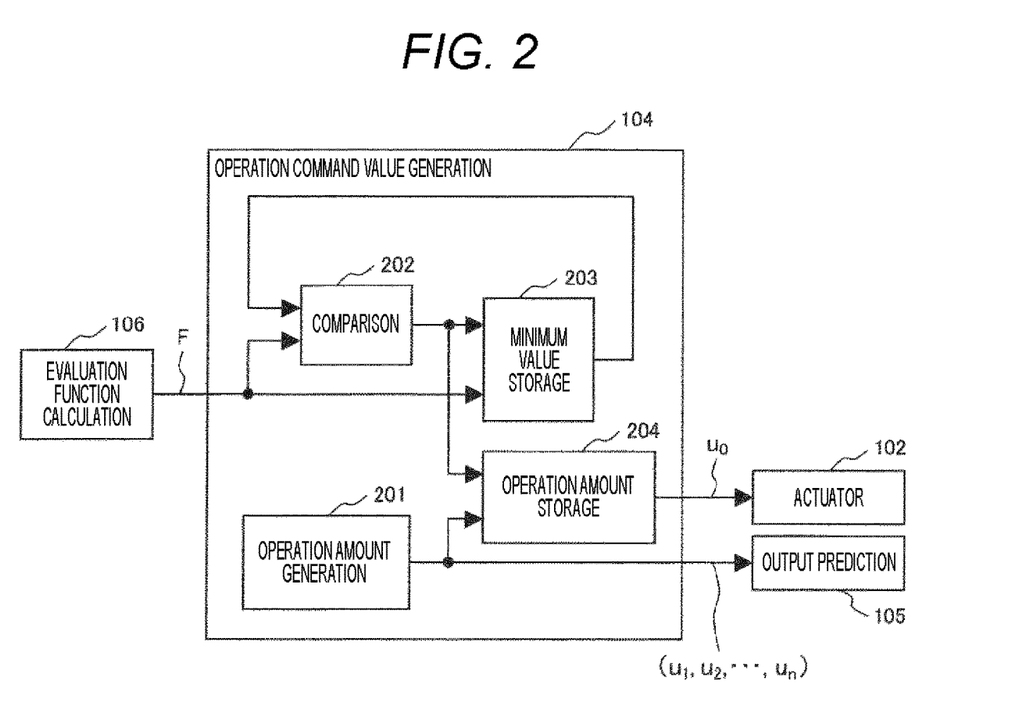
FIG. 2 is a diagram illustrating an example of a block configuration of an operation command value generation unit 104 in a model prediction control unit 101.

FIG. 2 is a diagram illustrating an example of a block configuration of the operation command value generation unit 104 in the model prediction control unit 101. The operation command value generation unit 104 inputs the evaluation function F and gives the operation amount candidates ($u_1$ to $u_n$).

A comparison unit 202 in the operation command value generation unit 104 compares the calculation result (the output of the evaluation function F) output from the evaluation function calculation unit 106 with the value stored in a minimum value storage unit 203. When the input value is smaller than the value stored in a minimum value storage unit 203, a storage command signal is output to the minimum value storage unit 203. The minimum value storage unit 203 stores the calculation result of the evaluation function according to the storage command signal from the comparison unit 202. A series of processes up to this point means to obtain the position where the evaluation function F in FIG. 8C is minimum.

An operation amount generation unit 201 is a unit that generates operation amount candidates ($u_1$ to $u_n$) from the operation amount candidate $u_1$ at the next time point to the operation amount candidate $u_n$ at the future n time point. As an example, an operation amount candidate value is generated by generating a random number as an initial value, and thereafter, a calculation for gradually changing the value is repeated to obtain a convergence solution. Specific methods include particle swarm optimization, ant colony optimization, and artificial bee colony algorithm.

The operation amount storage unit 204 stores operation command value candidates ($u_1$ to $u_n$) corresponding to the evaluation function values stored in the minimum value storage unit 203, and outputs the current operation amount $u_0$ to the actuator 102 of the brake, the accelerator, a steering angle of a front wheel, or the like. Further, the operation amount candidates ($u_1$ to $u_n$) are given to the output prediction unit 105 illustrated in FIG. 3.

Incidentally, the current operation amount $u_0$ can be calculated using, for example, the operation amount candidate $u_1$ at the next time obtained in the previous processing cycle. According to the operation command value generation unit 104 in FIG. 2, it is possible to obtain the operation amount candidates ($u_1$ to $u_n$) which are the time-series operation amounts at which the evaluation function F is minimized. This means that the trajectory indicated by the solid line in FIG. 7A is obtained.

Figure 3:
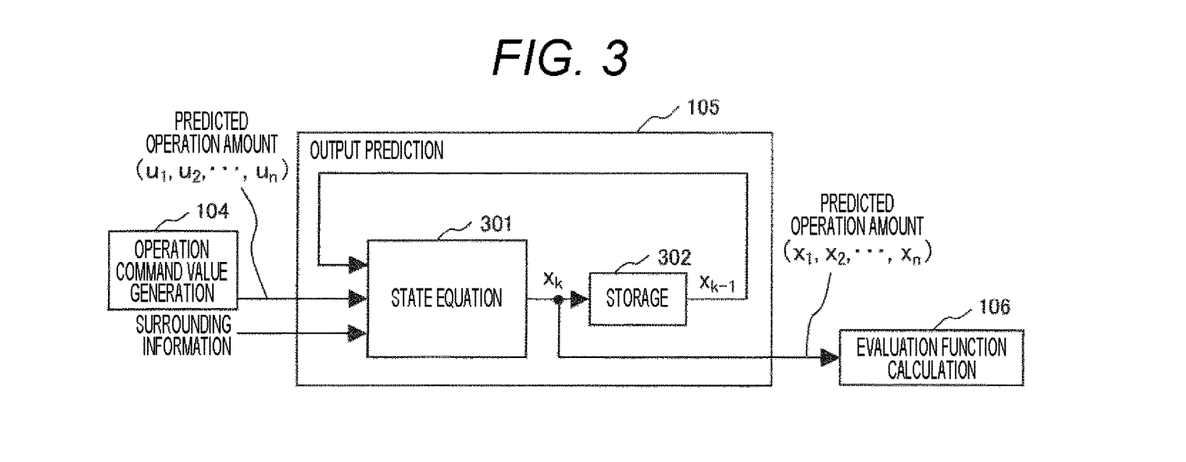
FIG. 3 is a diagram illustrating an example of a block configuration of an output prediction unit 105 in the model prediction control unit 101.

FIG. 3 is a diagram illustrating an example of a block configuration of the output prediction unit 105 in the model prediction control unit 101. Here, a state equation calculation unit 301 is a unit that expresses the operation model of the vehicle in a formula. For example, the acceleration and the angle of the traveling direction are input and converted into physical quantities such as the position coordinates, speed, and direction of the own vehicle. A storage unit 302 is a unit that temporarily stores the output of the state equation and uses the output for the prediction process at the next time point. For example, by storing the current position coordinates and speed, it is possible to obtain the predicted value of the position coordinates at the next time point by calculation.

In the example of FIG. 3, time-series predicted operation amounts ($u_1$ to $u_n$) from the operation command value generation unit 104 and the surrounding information are input in order to express the operation model of the vehicle in a formula. As an output, the control amount corresponding to the output of the actuator 102 is calculated as the time-series predicted control amount ($x_1$ to $x_n$), and is used in the calculation by the evaluation function calculation unit 106. Incidentally, in FIG. 3, the storage unit 302 is used to determine the reference position. However, the determination may be made based on the current position indicated by the actuator 102 as illustrated in FIG. 1.

Figure 4:
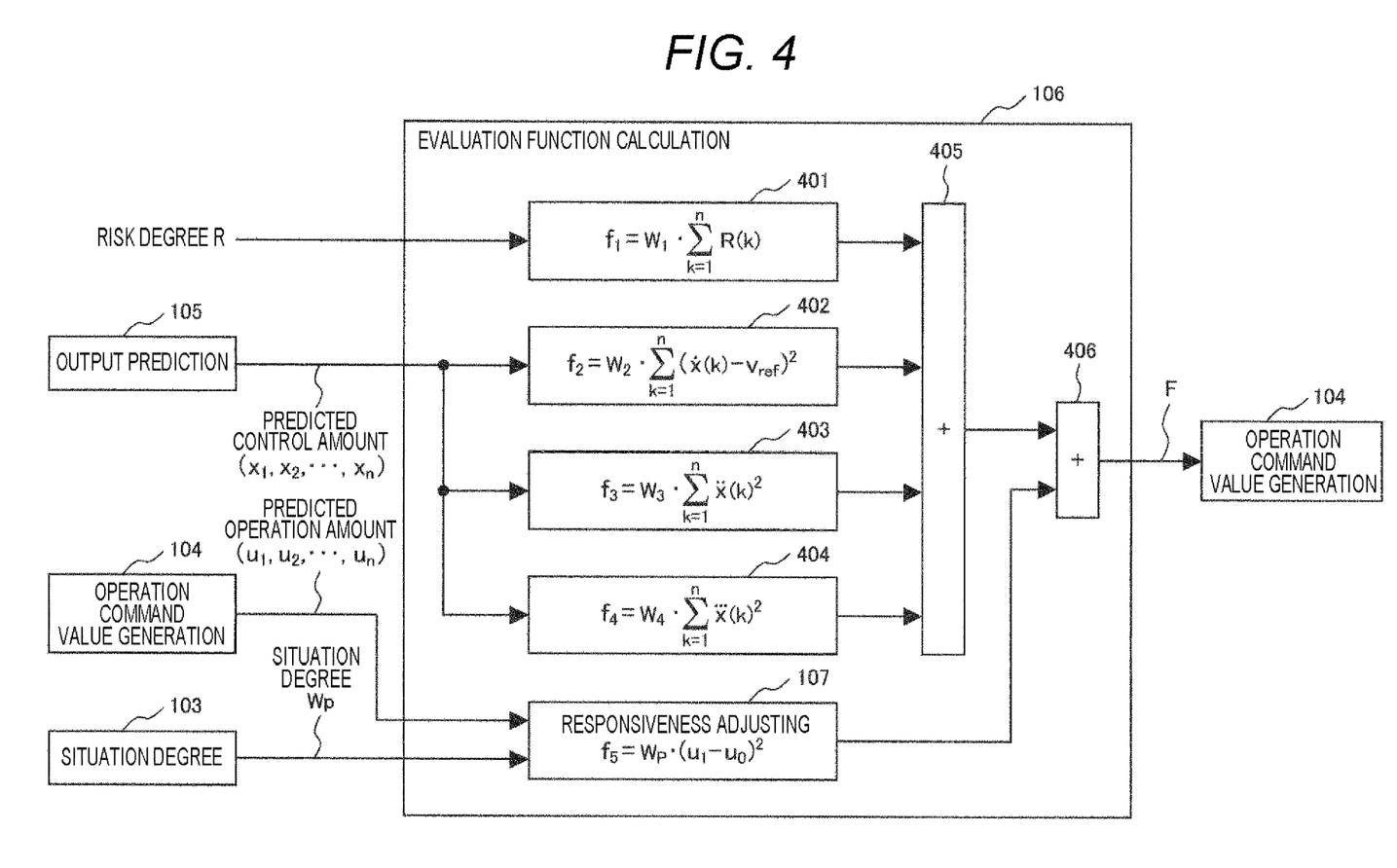
FIG. 4 is a diagram illustrating an example of a block configuration of an evaluation function calculation unit 106 in the model prediction control unit 101.

FIG. 4 is a diagram illustrating an example of a block configuration of the evaluation function calculation unit 106 in the model prediction control unit 101. The evaluation function calculation unit 106 generates the value of the evaluation function F to be given to the operation command value generation unit 104 by using a plurality of constraint condition functions (401 to 405) expressing the constraints necessary for the automatic driving as functions. In the example of FIG. 4, a constraint condition function is provided for the risk degree and the time-series predicted control amounts ($x_0$ to $x_n$) obtained by the output prediction unit 105. In addition, the constraint condition function for the predicted operation amount ($u_1$ to $u_n$) is provided in the responsiveness adjusting unit 107, and the responsiveness adjusting unit 107 adjusts the output of the constraint condition function according to the situation degree Wp obtained by the situation degree detection unit 103.

The evaluation function calculation unit 106 includes a plurality of constraint condition function calculation units (401 to 404), a responsiveness adjusting unit 107, and addition units 405 and 406. In the present invention, the evaluation function F is determined by the plurality of constraint condition functions (401 to 404) and the responsiveness adjusting unit 107.

The plurality of constraint condition functions are a function f1 for the risk degree obtained by a risk degree calculation unit 401, a function f2 for the speed error obtained by a speed error calculation unit 402, a function f3 for the acceleration obtained by an acceleration calculation unit 403, and a function f4 for the jerk obtained by an acceleration calculation unit 404. The evaluation function F is a function configured by five elements in which a function f5 for the responsiveness obtained by the responsiveness adjusting unit 107 is further added thereto. The numerical value determined by these five elements is determined to be the smallest.

Hereinafter, each of the plurality of constraint condition function calculation units (401 to 404) will be described. First, the risk degree calculation unit 401 is the constraint condition function f1 for risk degrees in which a risk degree R(k) at each time point from the next time point (k=1) to the future n time point (k=n) from the surrounding information and the relative position information of the own vehicle are obtained, for example, from the situation degree detection unit 103, and the multiplication result of the risk level R(k) and the weight coefficient $W_1$ is calculated to obtain the sum of those values.

The speed error calculation unit 402 is the constraint condition function f2 for speeds in which the acceleration information of the own vehicle is integrated to obtain a speed, and the multiplication result of the square of the difference from the target speed $V_{ref}$ at each time point from the next time point (k=1) to the future n time point (k=n) and the weight coefficient $W_2$ is calculated to obtain the sum of those values.

The acceleration calculation unit 403 is the constraint condition function f3 for accelerations in which the multiplication result of the square of the acceleration at each time point from the next time point (k=1) to the future n time point (k=n) and the weight coefficient $W_3$ is calculated from the acceleration information of the own vehicle to obtain the sum of those values.

The jerk calculation unit 404 is the constraint condition function f4 for jerks in which the acceleration information of the own vehicle is differentiated to obtain a jerk, and the multiplication result of the square of the jerk at each time point from the next time point (k=1) to the future n time point (k=n) and the weight coefficient $W_4$ is calculated to obtain the sum of those values. The addition unit 405 adds the output results of the respective constraint condition functions of the constraint condition function calculation units (401 to 404).

The responsiveness adjusting unit 107 is a constraint condition function f5 for responsiveness in which the multiplication result of the square of the difference between the current operation amount $u_0$ and the next operation amount $u_1$ and the situation degree Wp input from the situation degree detection unit 103 are obtained.

The evaluation function calculation unit 106 is configured as described above. However, as described above, the prediction control device controls the vehicle with the operation amount u when the output of the evaluation function F is minimized. On the other hand, the risk degree constraint condition function f1, the speed error constraint condition function f2, the acceleration constraint condition function f3, and the jerk constraint condition function f4 among of the five constraint condition functions that determine the output of the evaluation function F reflect the driving state at the time. Assuming that the functions output substantially constant values, the output of the evaluation function F is determined by the responsiveness constraint condition function f5, which is determined by the situation degree Wp. That is, the concept of the configuration of the evaluation function calculation unit 106 illustrated in FIG. 4 is that the output of the evaluation function F can be arbitrarily determined depending to the situation degree Wp.

In the present invention, when the ride comfort is prioritized, the situation degree Wp is adjusted to a value close to "1", and when the danger avoidance is prioritized, the situation degree Wp is adjusted to a value close to "0". The operation of the responsiveness adjusting unit 107 will be specifically described with reference to FIGS. 9A and 9B.

Figure 9A:
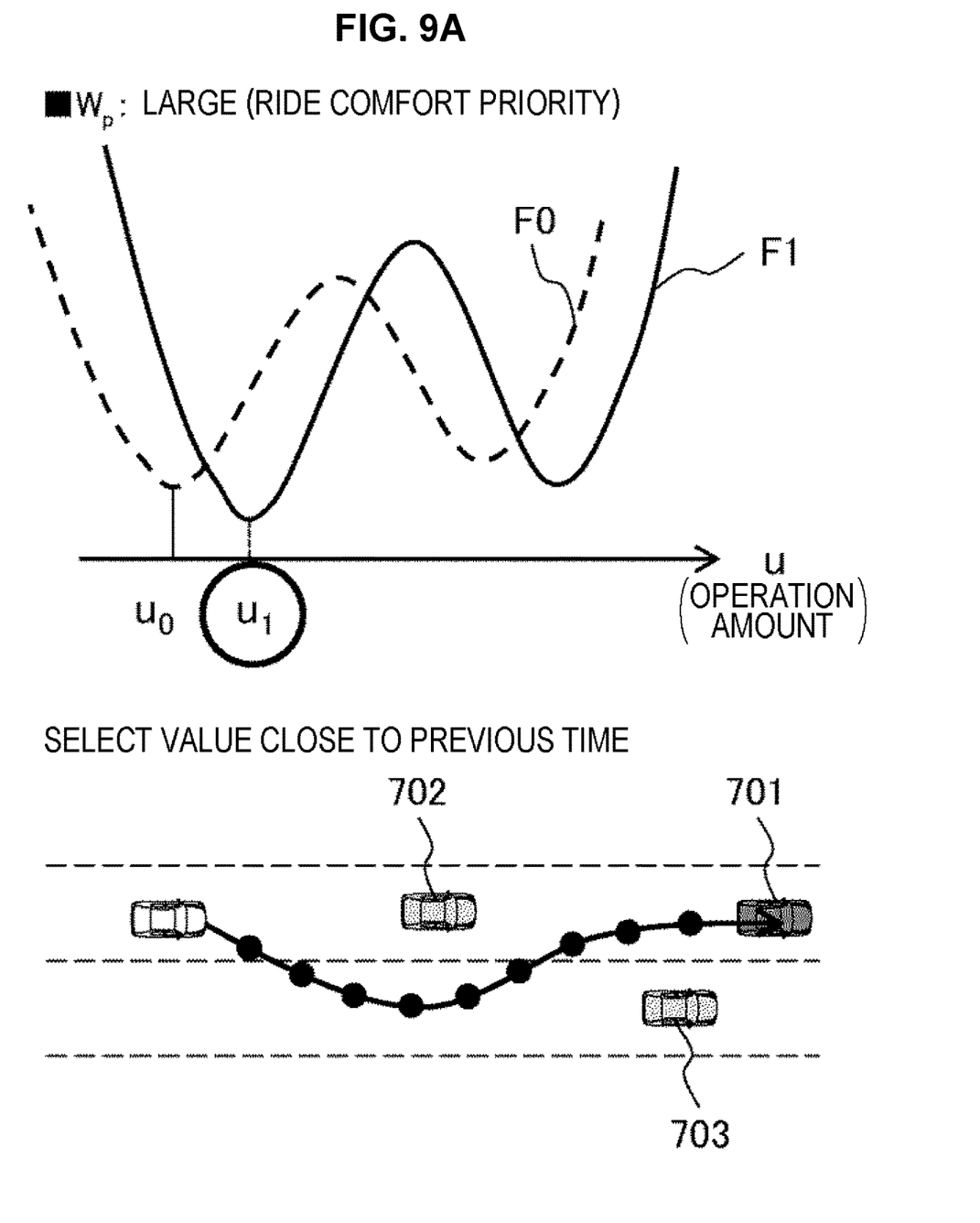
FIG. 9A is a diagram specifically illustrating a case where a situation degree Wp in FIG. 4 is set to be a value close to "1" from the viewpoint of giving priority to ride comfort by an operation of the responsiveness adjusting unit 107.
Figure 9B:
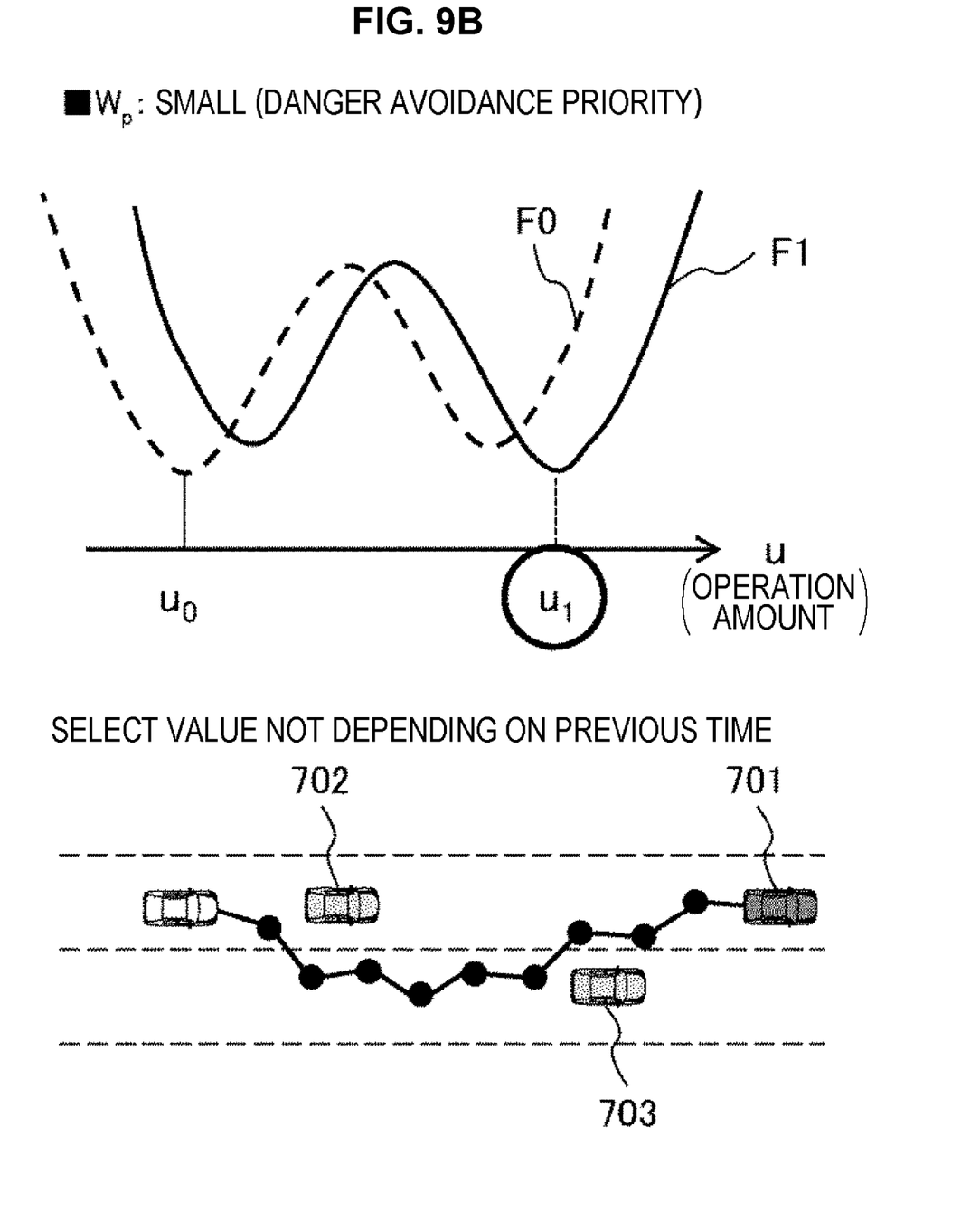
FIG. 9B is a diagram specifically illustrating a case where the situation degree Wp in FIG. 4 is set to be a value close to "0" from the viewpoint of giving priority to danger avoidance by the operation of the responsiveness adjusting unit 107.

FIG. 9A illustrates a case where the situation degree Wp of FIG. 4 is set to a value close to "1" from the viewpoint of giving priority to ride comfort, and FIG. 9B illustrates a case where the situation degree Wp of FIG. 4 is set to a value close to "0" from the viewpoint of giving priority to danger avoidance. As illustrated in FIG. 9A, when the situation degree Wp is a value close to 1 (ride comfort priority), in the responsiveness function of the responsiveness adjusting unit 107, $u_1$ needs to take a value close to $u_0$ in order to make the value of $Wp(u_1-u_0)^2$ close to 0. As a result, a small change amount is selected as the next operation amount $u_1$ with respect to the current operation amount $u_0$, and thus, a driving operation with small change can be ensured.

Also, as illustrated in FIG. 9B, when the situation degree Wp is a value close to 0 (danger avoidance priority), in the responsiveness function of the responsiveness adjusting unit 107, $u_1$ may be a value apart from $u_0$ in order to make the value of $Wp(u_1-u_0)^2$ close to 0. As a result, a large change amount is selected as the next operation value $u_1$ with respect to the current operation value $u_0$, and thus, a prompt driving operation can be ensured.

Incidentally, in the process of the responsiveness adjusting unit 107 illustrated in FIG. 4, the difference between the current operation amount $u_0$ and the next operation amount $u_1$ is used. In order to reduce the influence of noise, a plurality of past actual values and future predicted values may be used instead of the current operation amount $u_0$. In addition, the control amount is a function output of the operation amount by the state equation calculation unit 301 in FIG. 3, and a difference between the next control amount $x_1$ and the current control amount $x_0$ may be used.

Figure 5A:
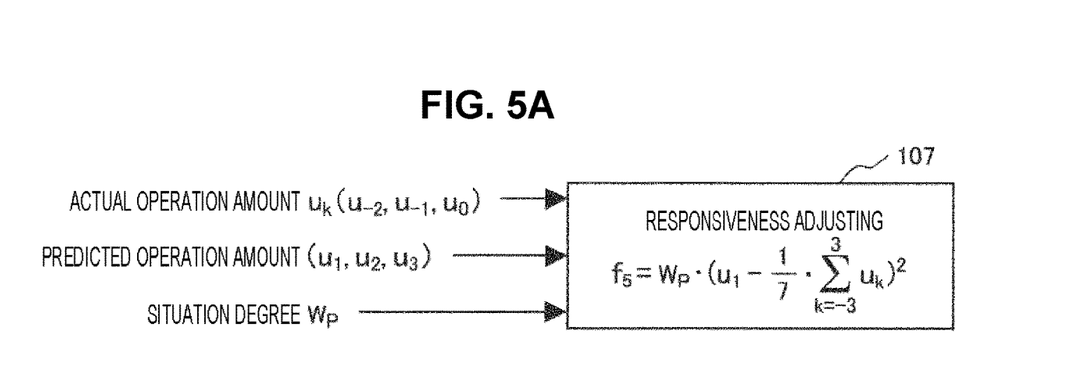
FIG. 5A is a diagram illustrating a configuration example of a responsiveness adjusting unit 107 using a moving average value of a past actual control amount and a future predicted control amount.
Figure 5B:
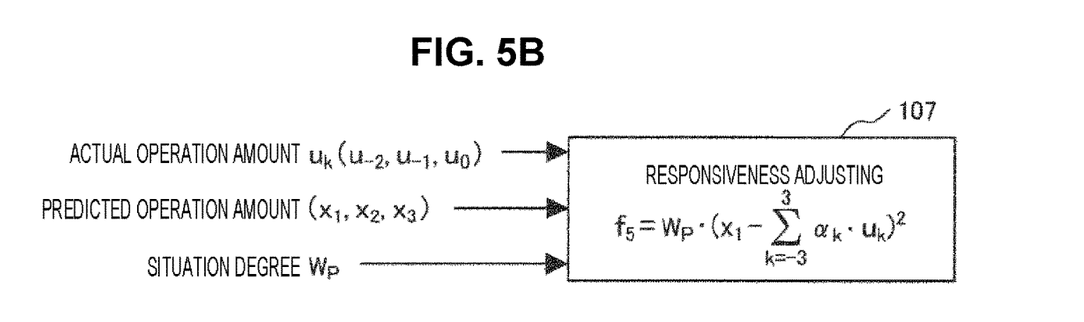
FIG. 5B is a diagram illustrating a configuration example of the responsiveness adjusting unit 107 using a weighted average value of the past actual control amount and the future predicted control amount.
Figure 5C:
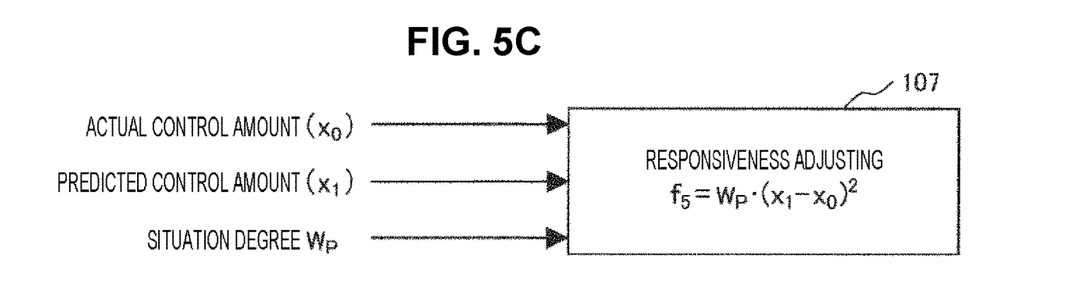
FIG. 5C is a diagram illustrating a configuration example of the responsiveness adjusting unit 107 using operation amounts $u_1$ and $u_0$.

Next, another embodiment of the responsiveness adjusting unit 107 will be described. FIG. 5A is an example in which a moving average value of past actual operation amounts and future predicted operation amounts is used instead of the current operation value $u_0$. FIG. 5B is an example in which a weighted average value of the past actual operation amounts and the future predicted operation amounts is used instead of the current operation value $u_0$. FIG. 5C is an example in which the control amounts $x_1$ and $x_0$ are used instead of the operation amounts $u_1$ and $u_0$.

Figure 6:
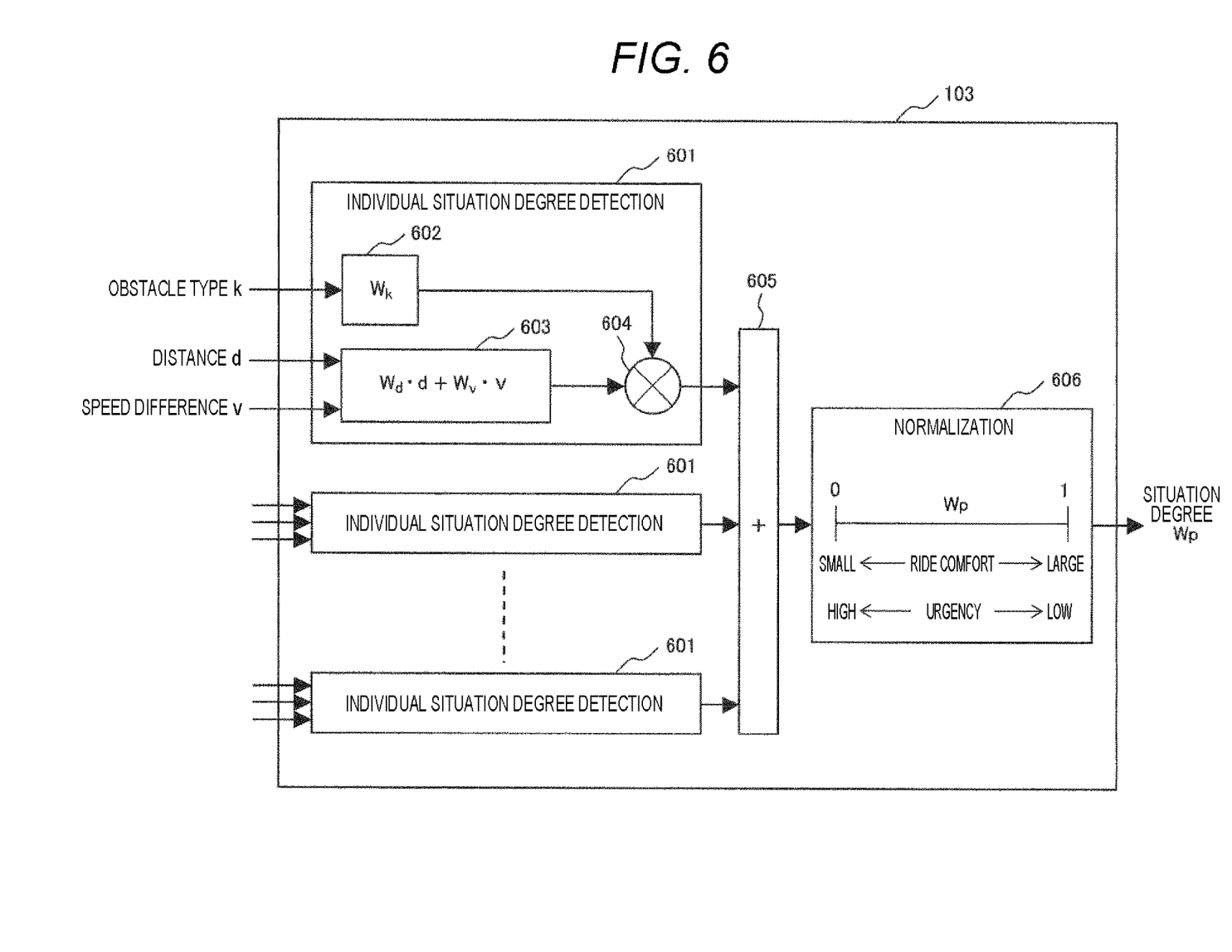
FIG. 6 is a diagram illustrating an example of a block configuration of a situation degree detection unit 103.

FIG. 6 is a diagram illustrating an example of a block configuration of the situation degree detection unit 103. The situation degree detection unit 103 includes a plurality of individual situation degree detection units 601, an addition unit 605, and a normalization unit 606. The individual situation degree detection unit 601 is a unit that detects a possibility of collision with one obstacle around the own vehicle. A plurality of individual situation degree detection units 601 are provided to detect a possibility of collision with different obstacles around the own vehicle.

The individual situation degree detection unit 601 includes a type coefficient setting unit 602, a margin calculation unit 603, a multiplication unit 604, an addition unit 605, and a normalization unit 606. Among these, the type coefficient setting unit 602 is a unit that selects a different coefficient Wk according to the input obstacle type. For example, the value of the coefficient increases in the order of pedestrian<bicycle<vehicle. The margin calculation unit 603 inputs the distance and the relative speed between the own vehicle and the obstacle and outputs a numerical value of the margin between the distance and the relative speed. In this example, a larger value is output as the margin as the relative distance is larger and the relative speed is larger. The multiplication unit 604 is a unit that multiplies the type coefficient by the margin. The multiplication result is smaller in the case of a pedestrian than in the case of a car even with the same margin. This is because priority is given to pedestrian safety. The addition unit 605 is a unit that adds the outputs of the plurality of individual situation degree detection units 601 to calculate the overall situation degree. The normalization unit 606 is a unit that normalizes the situation degree Wp to a value between 0 and 1 and outputs the value. As the situation degree Wp is closer to 1, the ride comfort is better. As the situation degree Wp is closer to 0, the urgency is higher.

The above-described prediction control device according to the present invention includes a unit that adjusts the difference between the current operation amount and the next operation amount. This function is mainly configured by the evaluation function calculation unit 106 and the operation command value generation unit 104. Here, as illustrated in FIG. 4, the situation degree is set as the weight coefficient, and a value obtained by multiplying the difference between the current operation amount and the next operation amount by the weight coefficient is included in the evaluation function. Alternatively, the situation degree is set as the weight coefficient, and a value obtained by multiplying the difference between the next operation amount and the moving average value of the past actual operation amount and the future predicted operation amount by the weight coefficient is included in the evaluation function. Alternatively, the situation degree is set as the weight coefficient, and a value obtained by multiplying the difference between the next control amount and the load average value of the past actual operation amount and the future predicted operation amount by the weight coefficient is included in the evaluation function. Alternatively, the situation degree is set as the weight coefficient, and a value obtained by multiplying the difference between the current control amount and the next control amount by the weight coefficient is included in the evaluation function.

To further briefly describe the device of the present invention, the device may be "a prediction control device that determines an operation amount given to an actuator for automatic driving of a vehicle, the device including: a unit that detects a situation degree from surrounding information and vehicle information; a unit that generates an operation amount per unit time from the surrounding information and the vehicle information and outputs the operation amount to the actuator; and a unit that adjusts a difference between a current operation amount and a next operation amount according to a value of the situation degree".

According to the above-described device of the present invention, it is possible to provide a prediction control device in which both the ride comfort during normal driving and the rapid operation in an emergency are achieved as if a person drives.

REFERENCE SIGNS LIST 101 model prediction control unit
102 actuator
103 situation degree detection unit
104 operation command value generation unit
105 output prediction unit
106 evaluation function calculation unit
107 responsiveness adjusting unit
108 notification unit
201 operation amount generation unit
202 comparison unit
203 minimum value storage unit
204 operation amount storage unit
301 state equation calculation unit
302 storage unit
401 risk degree calculation unit
402 speed error calculation unit
403 acceleration calculation unit
404 jerk calculation unit
405 addition unit
406 addition unit
601 individual situation degree detection unit
602 type coefficient setting unit
603 margin calculation unit
604 multiplication unit
605 addition unit
606 normalization unit
701 own vehicle
702 another vehicle
703 another vehicle

The invention claimed is:

1. A prediction control device that determines an operation amount given to an actuator for automatic driving of a vehicle, the device comprising:
   an operation command value generation unit that generates an operation amount for the actuator and an operation amount candidate as a predicted value;
   an output prediction unit that outputs a control amount candidate as a predicted value corresponding to an actuator output by using a state equation expressing an operation model of the vehicle in a formula;
   an evaluation function calculation unit that expresses constraint conditions necessary for the automatic driving of the vehicle by a plurality of functions, and obtains a sum of outputs of the respective functions with respect to the constraint conditions;
   a situation degree detection unit that obtains a situation degree that is a measure of giving priority to ride comfort or giving priority to danger avoidance from a surrounding situation of an own vehicle while traveling; and
   a responsiveness adjusting unit that obtains a next operation amount candidate from the situation degree from the situation degree detection unit, wherein
   the operation command value generation unit generates the operation amount for the actuator according to an output from the evaluation function calculation unit, and the responsiveness adjusting unit adjusts the output from the evaluation function calculation unit according to the situation degree, and
   the responsiveness adjusting unit includes a constraint condition function for responsiveness which uses a difference between a current operation amount and a next operation amount from the operation amount candidate as the predicted value from the operation command value generation unit and the situation degree input from the situation degree detection unit.

2. The prediction control device according to claim 1, wherein the operation command value generation unit determines an operation amount for the actuator according to a value at which the output of the evaluation function calculation unit is minimized.

3. The prediction control device according to claim 1, wherein
the output prediction unit applies a surrounding situation of the own vehicle while traveling and the operation amount candidate as a predicted value from the operation command value generation unit to a state equation expressing an operation model of the vehicle in a formula to obtain a control amount candidate as a predicted value corresponding to the actuator output.

4. The prediction control device according to claim 1, wherein
in the evaluation function calculation unit, the constraint condition expressing the constraint conditions necessary for the automatic driving of the vehicle in a plurality of functions includes a constraint condition on a risk degree obtained from surrounding information and relative position information of the own vehicle.

5. The prediction control device according to claim 1, wherein
in the evaluation function calculation unit, the constraint condition expressing the constraint condition necessary for the automatic driving of the vehicle in a plurality of functions includes a constraint condition on a control amount candidate as a predicted value obtained by the output prediction unit.

6. The prediction control device according to claim 5, wherein
the constraint condition on the control amount candidate as the predicted value obtained by the output prediction unit includes at least one of constraint conditions on a speed, an acceleration, and a jerk of the vehicle.

7. The prediction control device according to claim 1, wherein the responsiveness adjusting unit includes a second constraint condition function for responsiveness which uses a difference between the operation amount candidate as the predicted value from the operation command value generation unit and an actual operation amount and the situation degree input from the situation degree detection unit.

8. The prediction control device according to claim 1, wherein
the responsiveness adjusting unit includes a third constraint condition function for responsiveness which uses a difference between a control amount candidate as a predicted value obtained by the output prediction unit and an actual control amount and the situation degree input from the situation degree detection unit.

9. The prediction control device according to claim 1, wherein the situation degree detection unit obtains the situation degree from a type of an obstacle, a distance between the own vehicle and the obstacle, and a relative speed.

10. The prediction control device according to claim 1, wherein
the prediction control device includes a unit that adjusts a difference between the current operation amount and the next operation amount.

11. The prediction control device according to claim 10, wherein
in the unit that adjusts the difference between the current operation amount and the next operation amount, the situation degree is set as a weight coefficient, and a value obtained by multiplying the difference between the current operation amount and the next operation amount by the weight coefficient is included in an evaluation function.

12. The prediction control device according to claim 10, wherein
in the unit that adjusts the difference between the current operation amount and the next operation amount, adjustment contents are output to an external device via a notification unit.

13. The prediction control device according to claim 1, wherein
in the unit that adjusts the difference between the current operation amount and the next operation amount, the situation degree is set as the weight coefficient, and a value obtained by multiplying a difference between a moving average value of past actual operation amounts and future predicted operation amounts and the next operation amount by the weight coefficient is included in the evaluation function.

14. The prediction control device according to claim 1, wherein
in the unit that adjusts the difference between the current operation amount and the next operation amount, the situation degree is set as the weight coefficient, and a value obtained by multiplying a difference between a load average value of past actual operation amounts and future predicted operation amounts and a next control amount by the weight coefficient is included in the evaluation function.

15. The prediction control device according to claim 1, wherein
in the unit that adjusts the difference between the current operation amount and the next operation amount, the situation degree is set as the weight coefficient, and a value obtained by multiplying a difference between a current control amount and the next control amount by the weight coefficient is included in the evaluation function.

16. A prediction control method that determines an operation amount given to an actuator for automatic driving of a vehicle, the method comprising:
generating an operation amount for the actuator and an operation amount candidate as a predicted value;
obtaining a control amount candidate as a predicted value corresponding to an actuator output by using a state equation expressing an operation model of the vehicle in a formula;
expressing constraint conditions necessary for the automatic driving of the vehicle by a plurality of functions, and obtaining a sum of outputs of the respective functions with respect to the constraint conditions;
obtaining a situation degree that is a measure of giving priority to ride comfort or giving priority to danger avoidance from a surrounding situation of an own vehicle while traveling; and
obtaining a next operation amount candidate from the situation degree, wherein
the operation amount for the actuator is generated according to the sum of the outputs from the respective functions, and the sum of the outputs from the respective functions is adjusted according to the situation degree, and
the operation amount for the actuator is allowed such that a difference between a previous operation amount and the current operation amount is reduced according to the sum of the outputs of the respective functions for the constraint conditions, and the difference between the previous operation amount and the current operation amount increases when the situation degree gives priority to danger avoidance.

17. A prediction control device that determines an operation amount given to an actuator for automatic driving of a vehicle, the device comprising:
an operation command value generation unit that generates an operation amount for the actuator and an operation amount candidate as a predicted value;
an output prediction unit that outputs a control amount candidate as a predicted value corresponding to an actuator output by using a state equation expressing an operation model of the vehicle in a formula;
an evaluation function calculation unit that expresses constraint conditions necessary for the automatic driving of the vehicle by a plurality of functions, and obtains a sum of outputs of the respective functions with respect to the constraint conditions;
a situation degree detection unit that obtains a situation degree that is a measure of giving priority to ride comfort or giving priority to danger avoidance from a surrounding situation of an own vehicle while traveling; and
a responsiveness adjusting unit that obtains a next operation amount candidate from the situation degree from the situation degree detection unit, wherein
the operation command value generation unit generates the operation amount for the actuator according to an output from the evaluation function calculation unit, and the responsiveness adjusting unit adjusts the output from the evaluation function calculation unit according to the situation degree, and
the responsiveness adjusting unit includes a constraint condition function for responsiveness which uses a difference between the operation amount candidate as the predicted value from the operation command value generation unit and an actual operation amount and the situation degree input from the situation degree detection unit.

* * * * *